United States Patent
Matson et al.

(10) Patent No.: US 7,197,399 B2
(45) Date of Patent: Mar. 27, 2007

(54) METHOD OF MULTIPLE ATTENUATION

(75) Inventors: Kenneth H. Matson, Houston, TX (US); Raymond Abma, Houston, TX (US)

(73) Assignee: BP Corporation North America, Inc., Warrenville, IL (US)

(*) Notice: Subject to any disclaimer, the term of this patent is extended or adjusted under 35 U.S.C. 154(b) by 59 days.

(21) Appl. No.: 11/108,250

(22) Filed: Apr. 18, 2005

(65) Prior Publication Data
US 2006/0155477 A1    Jul. 13, 2006

Related U.S. Application Data

(60) Provisional application No. 60/643,671, filed on Jan. 13, 2005.

(51) Int. Cl.
G01V 1/28    (2006.01)

(52) U.S. Cl. .................................................. 702/17

(58) Field of Classification Search ................ 702/14, 702/17, 18; 367/73
See application file for complete search history.

(56) References Cited

U.S. PATENT DOCUMENTS

| | | | | |
|---|---|---|---|---|
| 5,544,126 | A | * | 8/1996 | Berryhill ..................... 367/52 |
| 6,832,161 | B1 | | 12/2004 | Moore |
| 2005/0065758 | A1 | | 3/2005 | Moore |
| 2005/0157589 | A1 | | 7/2005 | Laake |

OTHER PUBLICATIONS

*Offset continuation and DMO*, printout from URL http://sepwww.standord.edu/public/docs/sep107/paper_html/node83.html, Stanford Exploration Project, Dec. 28, 2000. pp. 1-4.
Stewart, Peter, *Multiple attentuation techniques suitable for varying water depths.*, 2004 CSEG National Convention, Great Explorations, Canada and Beyond, pp. 1-2.
Liner, Christopher L., *General theory and comparative anatomy of dip moveout.* Geophysics, vol. 55, No. 5 (May 1990); p. 595-607, 8 FIGS.
Verschuur, D.J., Berkhout, A.J., and Wapenaar, C.P.A., *Adaptavie surface-related multiple elimination.* Geophysics, Vo., 57, No. 9 (Sep. 1992). p. 1166-1177, 12 FIGS.

(Continued)

*Primary Examiner*—Donald McElheny, Jr.
(74) *Attorney, Agent, or Firm*—Fellers, Snider, Blankenship, Bailey & Tippens, P.C.; Terry L. Watt

(57) ABSTRACT

According to a preferred aspect of the instant invention, there is provided herein a system and method for removing or attenuating multiples in datasets that is much more efficient than methods used heretofore. The increases in efficiency principally originate in two algorithmic advances. First, the instant inventors have improved the overall efficiency of the conventional SRME process by reordering the computations in a novel way. Second, the instant inventors have conceived and developed a faster method of computing the DMO transformation step that is often used as one component of the SMRE process, thereby increasing the efficiency of the multiple removal process even further.

16 Claims, 6 Drawing Sheets

OTHER PUBLICATIONS

Hugonnet, P., Lecoco, P., *SRME variations: partial SRME and hybrid SRME-Radon*, EAGE 65th Conference & Technical Exhibition, Stavanger, Norway, Jun. 2-5, 2003, pp. 101-104.

Matson, Ken H., et al., *Advanced Subsalt Imaging and 3D Surface Multiple Attenuation in Atlantis: A Case Study*. SEC Int'l Exposition and 74th Annual Meeting, Denver CO, Oct. 10-15, 2004.

Kabir, Nurul, Abma, Ray, and Xia, Ganyucan, *3D Wavefield Extrapolation based demultiple in Ormen Lange*, SEC Int'l Exposition and 74th Annual Meeting, Denver CO, Oct. 10-15, 2004.

Baumstein, Anotoly and Hadidi, Mohamed, *3D SRME: data reconstruction and application to field data*, SEC Int'l Exposition and 74th Annual Meeting, Denver CO, Oct. 10-15, 2004.

Matson, Ken and Xia, Ganyuan, *Combining free-surface multiple attentuation with wavefield continuation to attenuate 3D free-surface multiples on multi-component ocean-bottom seismic data*. SEC Int'l Exposition and 72nd Annual Meeting, Salt Lake City, Utah, Oct. 6-11, 2002.

Baumstein, Anatoly, *3D Inverse Shot Record DMO: a tool for shot-domain data regularization*, SEC Int'l Exposition and 74th Annual Meeting, Denver CO, Oct. 10-15, 2004.

Zhou, Binzhong, Mason, Iain M., and Greenhalgh, Stewart A., An accurate formulation of log-stretch dip moveout in the frequency-wavenumber domain, Geophysics, vol. 61, No. 3 (May-Jun. 1996: p. 815-820).

* cited by examiner

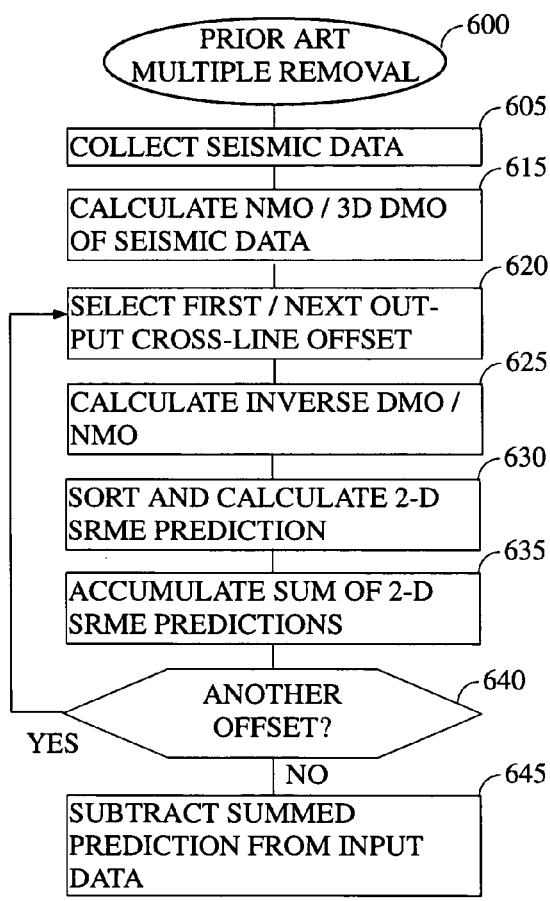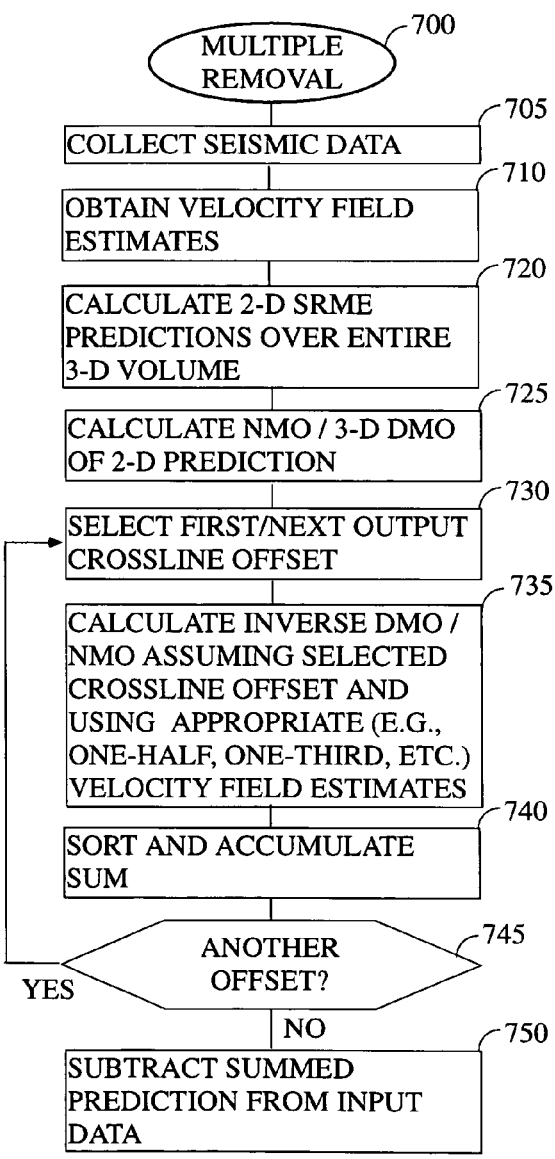

METHOD OF MULTIPLE ATTENUATION

RELATED CASES

This application claims the benefit of U.S. Provisional Patent Application Ser. No. 60/643,671 filed on Jan. 13, 2005, and incorporates said provisional application by reference into this disclosure as if fully set out at this point. Further this application is related to, and co-pending with, U.S. patent application Ser. No. 11/108,249 entitled "Method of DMO calculation for use in seismic exploration", filed contemporaneously herewith, the disclosure of which is incorporated herein by reference as if fully set out at this point.

TECHNICAL FIELD

This invention relates to the general subject of seismic exploration and, in particular, to methods for removing multiply reflected energy from seismic data.

BACKGROUND IF THE INVENTION

A seismic survey represents an attempt to image or map the subsurface of the earth by sending sound energy down into the ground and recording the "echoes" that return from the rock layers below. The source of the down-going sound energy might come, for example, from explosions or seismic vibrators on land, or air guns in marine environments. During a seismic survey, the energy source is placed at various locations near the surface of the earth above a geologic structure of interest. Each time the source is activated, it generates a seismic signal that travels downward through the earth, is reflected, and, upon its return, is recorded at a great many locations on the surface. Multiple source/recording combinations are then combined to create a near continuous profile of the subsurface that can extend for many miles. In a two-dimensional (2D) seismic survey, the recording locations are generally laid out along a single line, whereas in a three dimensional (3D) survey the recording locations are distributed across the surface in a grid pattern. In simplest terms, a 2D seismic line can be thought of as giving a cross sectional picture (vertical slice) of the earth layers as they exist directly beneath the recording locations. A 3D survey produces a data "cube" or volume that is, at least conceptually, a 3D picture of the subsurface that lies beneath the survey area. In reality, though, both 2D and 3D surveys interrogate some volume of earth lying beneath the area covered by the survey.

A seismic survey is composed of a very large number of individual seismic recordings or traces. In a typical 2D survey, there will usually be several tens of thousands of traces, whereas in a 3D survey the number of individual traces may run into the multiple millions of traces. Chapter 1, pages 9–89, of *Seismic Data Processing* by Ozdogan Yilmaz, Society of Exploration Geophysicists, 1987, contains general information relating to conventional 2D processing and that disclosure is incorporated herein by reference. General background information pertaining to 3D data acquisition and processing may be found in Chapter 6, pages 384–427, of Yilmaz, the disclosure of which is also incorporated herein by reference.

A modern seismic trace is a digital recording of the acoustic energy reflecting from inhomogeneities or discontinuities in the subsurface, a partial reflection occurring each time there is a change in the elastic properties of the subsurface materials. The digital samples are usually acquired at 0.002 second (2 millisecond or "ms") intervals, although 4 millisecond and 1 millisecond sampling intervals are also common. Each discrete sample in a conventional digital seismic trace is associated with a travel time, and in the case of reflected energy, a two-way travel time from the source to the reflector and back to the surface again, assuming, of course, that the source and receiver are both located on the surface. Many variations of the conventional source-receiver arrangement are used in practice, e.g. VSP (vertical seismic profile) surveys, ocean bottom surveys, etc. Further, the surface location of every trace in a seismic survey is carefully tracked and is generally made a part of the trace itself (as part of the trace header information). This allows the seismic information contained within the traces to be later correlated with specific surface and subsurface locations, thereby providing a means for posting and contouring seismic data—and attributes extracted therefrom—on a map (i.e., "mapping").

The data in a 3D survey are amenable to viewing in a number of different ways. First, horizontal "constant time slices" may be taken extracted from a stacked or unstacked seismic volume by collecting all of the digital samples that occur at the same travel time. This operation results in a horizontal 2D plane of seismic data. By animating a series of 2D planes it is possible for the interpreter to pan through the volume, giving the impression that successive layers are being stripped away so that the information that lies underneath may be observed. Similarly, a vertical plane of seismic data may be taken at an arbitrary azimuth through the volume by collecting and displaying the seismic traces that lie along a particular line. This operation, in effect, extracts an individual 2D seismic line from within the 3D data volume.

Seismic data that have been properly acquired and processed can provide a wealth of information to the explorationist, one of the individuals within an oil company whose job it is to locate potential drilling sites. For example, a seismic profile gives the explorationist a broad view of the subsurface structure of the rock layers and often reveals important features associated with the entrapment and storage of hydrocarbons such as faults, folds, anticlines, unconformities, and sub-surface salt domes and reefs, among many others. During the computer processing of seismic data, estimates of subsurface rock velocities are routinely generated and near surface inhomogeneities are detected and displayed. In some cases, seismic data can be used to directly estimate rock porosity, water saturation, and hydrocarbon content. Less obviously, seismic waveform attributes such as phase, peak amplitude, peak-to-trough ratio, and a host of others, can often be empirically correlated with known hydrocarbon occurrences and that correlation applied to seismic data collected over new exploration targets.

For all of the subsurface information that might be acquired via seismic data, this method is not without its problems. For example, one particularly troublesome problem in seismic data collection and analysis is the identification and removal of multiples. Those of ordinary skill in the art will understand that multiples in seismic data occur when the recorded seismic data contains energy that has been reflected more than once in the subsurface. Multiples often appear to all intents and purposes to be valid seismic reflectors and, to the extent that they are interpreted as such, can give rise to incorrect interpretations of the subsurface layer configuration, thereby potentially resulting in dry holes.

Of course, this problem is well known and a great deal of effort has historically gone into removing or attenuating multiples from seismic sections before interpretations are made. As might be expected, however, some of the most effective methods of multiple removal are computationally intensive. Although this might not pose much of a concern for a 2-D seismic line, computational efficiency becomes a critical factor when 3-D data sets are processed. Those of ordinary skill in the art will recognize that routines that attenuate or remove multiples can have run-times for 3-D data sets that stretch into months even on the fastest computers.

One method of attenuating multiples that has had some success is known as "surface-related multiple elimination" or "SRME". In brief, this method operates by creating a dataset that contains only predictions of the multiples that are present in the data. Specifically, the method seeks to predict the seismic expression of multiples that have experienced one or more reflections between the air-water interface and the subsurface. Then, the predicted multiples are subtracted from the original data leaving behind (at least theoretically) only the primary energy.

Although this method has been used successfully in many contexts, in the case of 3-D data sets it is very expensive to calculate. There are many reasons for this, but one important reason is that dip moveout (i.e., "DMO") is often applied to prestack seismic data to regularize it, i.e., to create a regular grid of interpolated traces from an irregular grid. This technique is especially useful in the instant context to create a regular gather that contains all of the possible offsets and azimuths in the survey from a common offset gather that is missing one or more of these offsets and/or azimuths.

Heretofore, as is well known in the seismic processing and seismic interpretation arts, there has been a need for a method of removing multiples from seismic data that was both effective and computationally efficient. Accordingly, it should now be recognized, as was recognized by the present inventor, that there exists, and has existed for some time, a very real need for a method of seismic data processing that would address and solve the above-described problems.

Before proceeding to a description of the present invention, however, it should be noted and remembered that the description of the invention which follows, together with the accompanying drawings, should not be construed as limiting the invention to the examples (or preferred embodiments) shown and described. This is so because those skilled in the art to which the invention pertains will be able to devise other forms of this invention within the ambit of the appended claims.

SUMMARY OF THE INVENTION

According to a preferred aspect of the instant invention, there is provided herein a system and method for removing or attenuating multiples in seismic datasets that is much more efficient than methods used heretofore. The increases in efficiency principally originate in two algorithmic advances. First, the instant inventors have improved the overall efficiency of the conventional SRME process by reordering the computations in a novel way. Second, the instant inventors have conceived and developed a faster method of computing the DMO step that is often used as one component of the SRME process, thereby increasing the efficiency of the process even further.

Turning first to the first improvement in efficiency in the computation of the SRME process, in the preferred embodiment, and as is discussed in greater detail hereinafter, there is provided a method of attenuating multiples in 3-D seismic data using SRME, wherein the step of predicting the multiple signal is performed before the regularization step, rather than afterward as has been done heretofore. As a consequence of the approach taken by the instant invention, the amount of computer time required to calculate a 3-D SRME can be reduced by a factor of ten or more when a small offset approximation is used. More generally, reductions in runtime on the order of two or more are commonly observed when using the instant method.

More particularly, in the prior art the steps involved with removing multiples in 3-D data via SRME are performed in the following order: data collection, application of AMO (i.e., data regularization by the application of DMO followed by inverse DMO), calculation of a multiple prediction for each 2-D seismic line produced via AMO, accumulation/summation of the lines containing the predicted multiple energy, and subtraction of the summed multiple prediction traces from the original data. Note that, in the prior art, the prediction step is calculated for each of the regularized lines that are produced by the AMO step.

However, according to a preferred embodiment of the instant invention, the order in which the prediction and AMO steps are performed is reversed, thereby greatly improving the efficiency of the computational process. That is, the preferred ordering of steps for purposes of the instant invention is: data collection, calculation of a multiple prediction for each 2-D seismic line, application of AMO to each predicted seismic line, summation of the lines containing the predicted multiple energy, and subtraction of the summed prediction from the original data. This ordering has the effect of causing the (more computationally intensive) multiple prediction step to be performed on a smaller dataset than would be required with prior art methods. Needless to say, this reduces dramatically the time necessary to calculate a SRME for a 3-D dataset.

Additionally, and according to another aspect of the instant invention, the inventors have developed a method of calculating DMO on seismic data in a highly efficient manner. The instant method is broadly based on the observation that, instead of using a single time window in the log-stretch domain to calculate a DMO transformation (and/or its inverse), multiple, preferably overlapping, windows are used. Preferably, the windows will be chosen in such a way as to cover the entire time range of the seismic traces in the survey.

The foregoing has outlined in broad terms the more important features of the invention disclosed herein so that the detailed description that follows may be more clearly understood, and so that the contribution of the instant inventor to the art may be better appreciated. The instant invention is not to be limited in its application to the details of the construction and to the arrangements of the components set forth in the following description or illustrated in the drawings. Rather, the invention is capable of other embodiments and of being practiced and carried out in various other ways not specifically enumerated herein. Finally, it should be understood that the phraseology and terminology employed herein are for the purpose of description and should not be regarded as limiting, unless the specification specifically so limits the invention.

BRIEF DESCRIPTION OF THE DRAWINGS

Other objects and advantages of the invention will become apparent upon reading the following detailed description and upon reference to the drawings in which:

FIG. 6 contains an illustration of the principal steps in the prior art method of removing multiple seismic energy using SRME.

FIG. 7 illustrates a flowchart of the principal steps in one embodiment of the instant invention.

DETAILED DESCRIPTION

Figure 1:
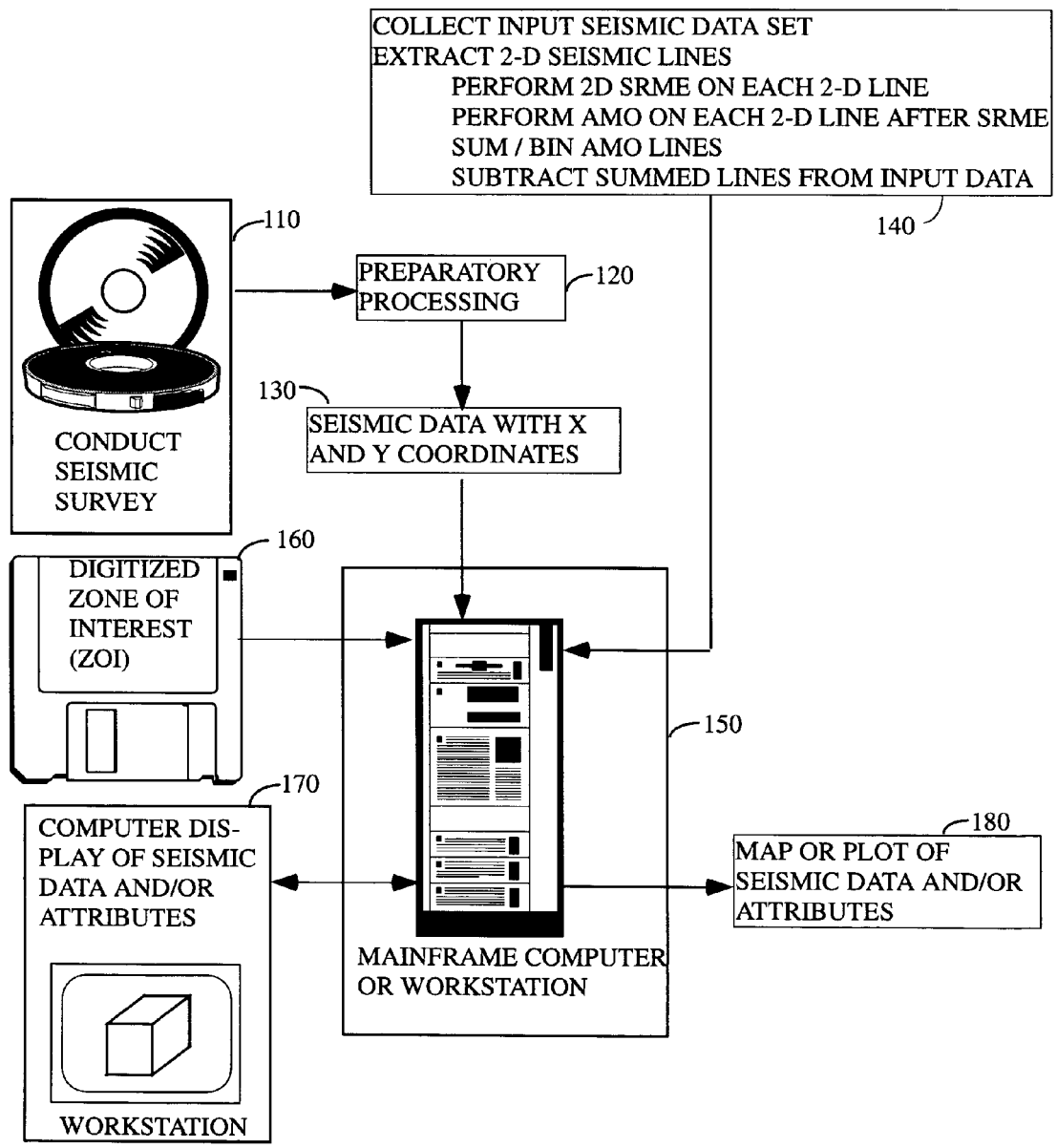
FIG. 1 illustrates the general environment of the instant invention.

While this invention is susceptible of being embodied in many different forms, there is shown in the drawings, and will herein be described hereinafter in detail, some specific embodiments of the instant invention. It should be understood, however, that the present disclosure is to be considered an exemplification of the principles of the invention and is not intended to limit the invention to the specific embodiments or algorithms so described.

General Environment of the Invention

FIG. 1 illustrates the general environment in which the instant invention would typically be used. Seismic data 110 are collected in the field (e.g., the data might be from a land-based survey, a marine survey, some combination of the two, etc.) over a subsurface target of potential economic importance and are typically sent thereafter to a processing center, although substantial processing can be done in the field if such is desired. In the processing center a variety of preparatory processes 120 might be applied to the seismic traces to make them ready for use by the methods disclosed hereinafter. The processed traces would then be made available for use by the instant invention and might be stored, by way of example only, on hard disk, magnetic tape, magneto-optical disk, DVD disk, or other mass storage means.

The methods disclosed herein would best be implemented in the form of a computer program 140 that has been loaded onto a general purpose programmable computer 150 where it is accessible by a seismic interpreter or processor. Note that a general purpose computer 150 would typically include, in addition to mainframes and workstations, computers that provide for parallel and massively parallel computations, wherein the computational load is distributed between two or more processors. As is also indicated in FIG. 1, in some preferred embodiments a digitized zone of interest model 160 would be specified by the user and provided as input to the processing computer program. In the case of a 3-D seismic section, the zone of interest 160 would typically include specifics as to the lateral extent and thickness (which might be variable and could be measured in time, depth, frequency, etc.) of a subsurface interval. The exact means by which such zones are created, picked, digitized, stored, and later read during program execution is unimportant to the instant invention and those skilled in the art will recognize that this might be done any number of ways.

A program 140 embodying the instant invention might be conveyed into the computer that is to execute it by means of, for example, a floppy disk, a magnetic disk, a magnetic tape, a magneto-optical disk, an optical disk, a CD-ROM, a DVD disk, a RAM card, flash RAM, a RAM card, a PROM chip, or loaded over a wired or wireless network. In a typical seismic processing environment, the methods of the instant invention would be made part of a larger package of software modules that is designed to perform many of the processing steps listed in FIG. 2. After processing by the instant methods, the resulting traces would then typically be sorted into gathers, stacked, and displayed either at a high resolution color computer monitor 170 or in hard-copy form as a printed seismic section or a map 180. The seismic interpreter would then use the displayed images to assist him or her in identifying subsurface features conducive to the generation, migration, or accumulation of hydrocarbons.

Figure 2:
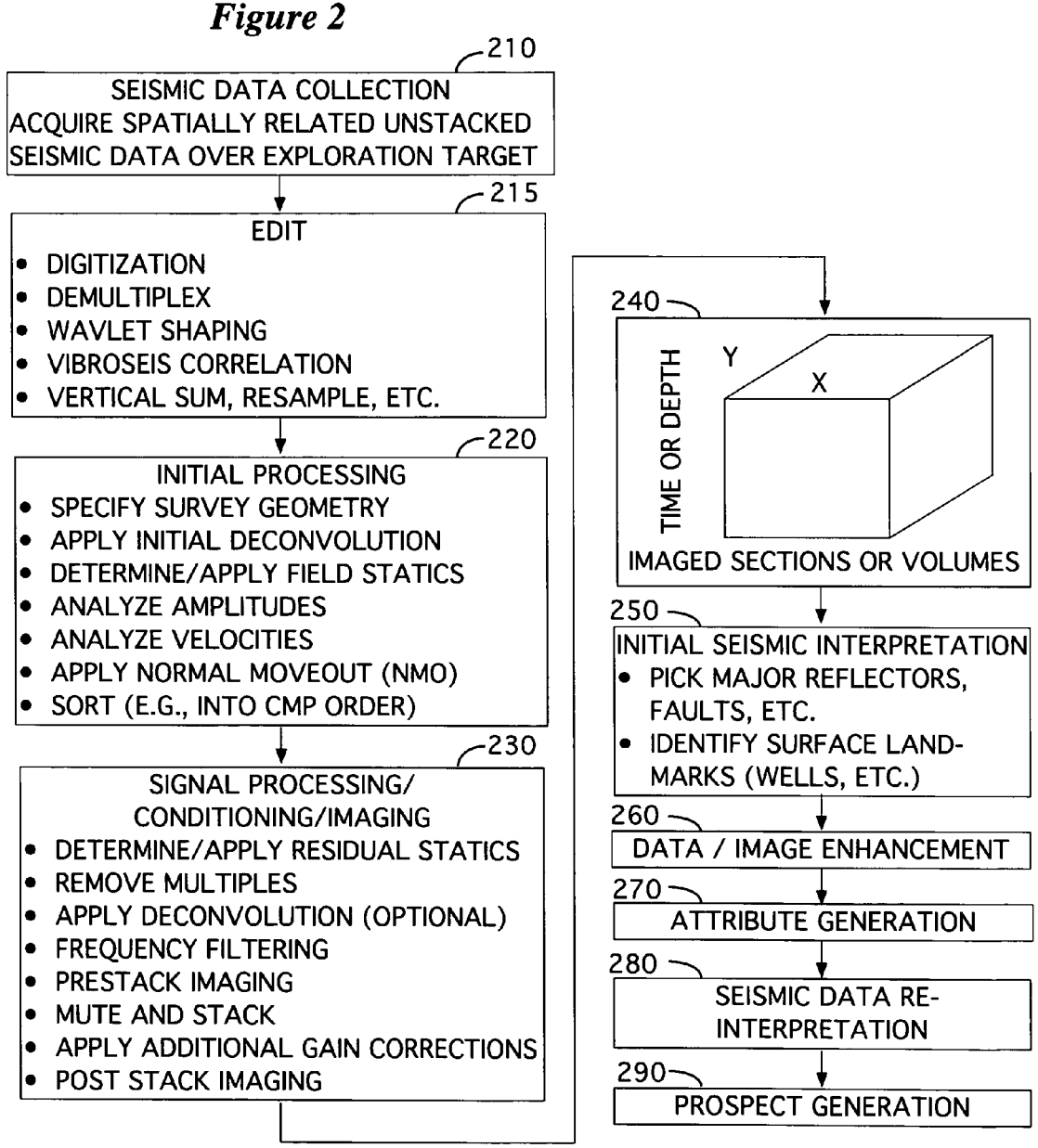
FIG. 2 illustrates a seismic processing sequence suitable for use with the instant invention.

As was indicated previously, the instant invention will preferably be made a part of and incorporated into a conventional seismic processing sequence of the sort generally indicated in FIG. 2. Those of ordinary skill in the art will recognize that the processing steps illustrated in FIG. 2 are only broadly representative of the sorts of processes that might be applied to such data and the choice and order of the processing steps, and the particular algorithms that have been selected, may vary markedly depending on the individual seismic processor, the signal source (dynamite, vibrator, etc.), the survey location (land, sea, etc.) of the data, the company that processes the data, etc.

As a first step, and as is generally illustrated in FIG. 2, a 2D or 3D seismic survey is conducted over a particular volume of the earth's subsurface (step 210). The data collected in the field consist of unstacked (i.e., unsummed) seismic traces which contain digital signals representative of the volume of the earth lying beneath the survey. Methods by which such data are obtained and processed into a form suitable for use by seismic processors and interpreters are well known to those of ordinary skill in the art.

The purpose of a seismic survey is to acquire a collection of spatially related seismic traces over a subsurface target of some potential economic importance. Data that are suitable for analysis by the methods disclosed herein might consist of, for purposes of illustration only, an unstacked 2-D seismic line, an unstacked 2-D seismic line extracted from a 3D seismic survey or, preferably, an unstacked 3D portion of a 3D seismic survey. The invention disclosed herein is most effective when applied to a group of unstacked seismic traces that have an underlying spatial relationship with respect to some subsurface geological feature. Again, for purposes of illustration only, the discussion that follows will be couched in terms of traces contained within a 3-D survey, although any assembled group of spatially related seismic traces could conceivably be used.

After the seismic data are acquired, they are typically taken to a processing center where some initial or preparatory processing steps are applied to them. As is illustrated in FIG. 2, a common early step 215 is designed to edit the input seismic data in preparation for subsequent processing (e.g., digitization, demux, wavelet shaping, bad trace removal, etc.). This might be followed by specification of the geometry of the survey (step 220) and storing of a shot/receiver number and a surface location as part of each seismic trace header. Once the geometry has been specified, it is customary to perform a velocity analysis and apply an NMO (normal move out) correction to correct each trace in time to account for signal arrival time delays caused by offset.

After the initial pre-stack processing is completed, it is customary to condition the seismic signal that is located within the unstacked seismic traces before creating stacked (or summed) data volumes (step 230). In FIG. 2 step 230 contains a typical "Signal Processing/Conditioning/Imaging" processing sequence, but those skilled in the art will recognize that many alternative processes could be used in place of the ones listed in the figure. In any case, the ultimate goal from the standpoint of the explorationist is the production of a stacked seismic volume or, in the case of 2D data, a stacked seismic line for use in the exploration for hydrocarbons within the subsurface of the earth. As will become apparent hereinafter, the methods of the instant invention would most likely be applied as part of step 220.

As is suggested in FIG. 2, any digital sample within a stacked seismic volume is uniquely identified by an (X, Y, TIME) triplet, with the X and Y coordinates representing some position on the surface of the earth, and the time coordinate measuring a recorded arrival time within the seismic trace (step 240). For purposes of specificity, it will be assumed that the X direction corresponds to the "in-line" direction, and the Y measurement corresponds to the "cross-line" direction, as the terms "in-line" and "cross-line" are generally understood in the art. Although time is a preferred and most common vertical axis unit, those skilled in the art understand that other units are certainly possible might include, for example, depth or frequency. Additionally, it is well known to those skilled in the art that it is possible to convert seismic traces from one axis unit (e.g., time) to another (e.g., depth) using standard mathematical conversion techniques.

The explorationist may do an initial interpretation 250 of the resulting stacked volume, wherein he or she locates and identifies the principal reflectors and faults wherever they occur in the data set. This might be followed by additional data enhancement 260 and/or attribute generation (step 270) of the stacked or unstacked seismic data. In many cases the explorationist will revisit his or her original interpretation in light of the additional information obtained from the data enhancement and attribute generation steps (step 280). As a final step, the explorationist will typically use information gleaned from the seismic data together with other sorts of data (magnetic surveys, gravity surveys, LANDSAT data, regional geological studies, well logs, well cores, etc.) to locate subsurface structural or stratigraphic features conducive to the generation, accumulation, or migration of hydrocarbons (i.e., prospect generation 290).

Preferred Embodiments

According to a preferred aspect of the instant invention, there is provided a system and method for removing multiply reflected energy from seismic surveys. In the preferred embodiment, the method will be applied to data that has been collected via a 3-D seismic survey, although those of ordinary skill in the art will recognize that the instant method is applicable to other sorts of seismic datasets as well.

Figure 4:
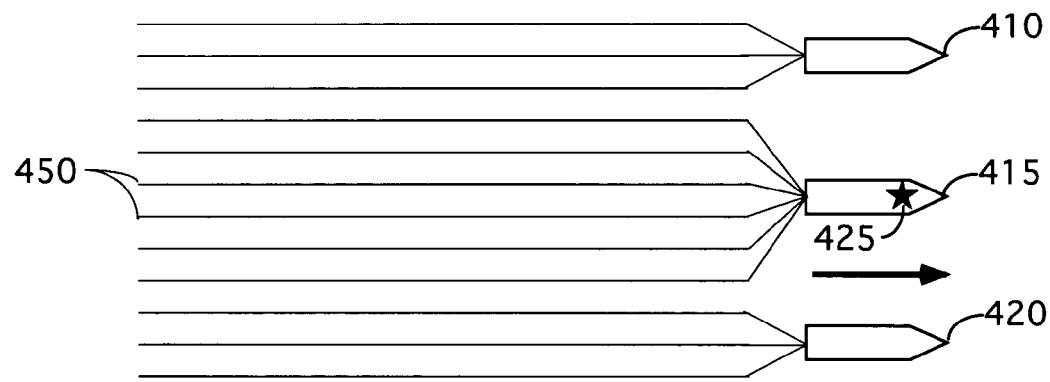
FIG. 4 illustrates the acquisition geometry for a conventional towed streamer survey.
Figure 5:
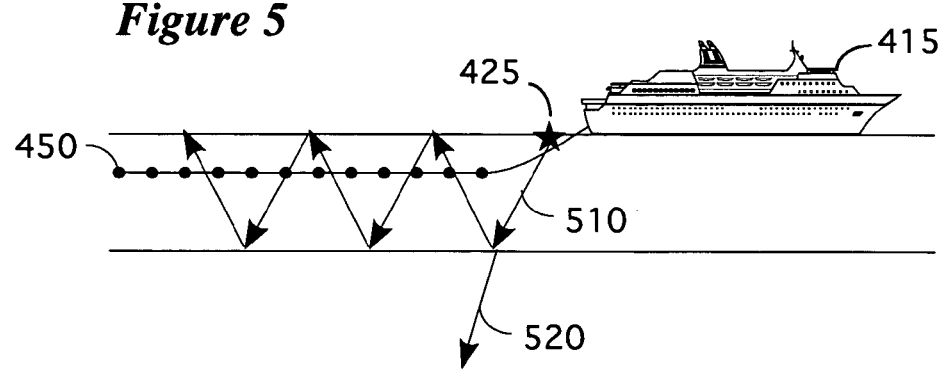
FIG. 5 contains a schematic illustration of how water bottom multiples might arise in an offshore seismic survey.

Turning first to FIGS. 4, 5, and 7, wherein a preferred embodiment of the instant invention 700 is illustrated, according to a first preferred step 705 seismic data are collected over a subsurface target of interest. The survey might be conducted on land, offshore, some combination of the two, etc. However, in the preferred embodiment the survey will be marine in origin and (as is illustrated in greater detail in FIG. 4) will consist a number of towed streamers 450, each of which contains a large number of hydrophone sensing elements within. In the typical survey of this nature, there will usually be one or more boats 410–420 each of which is towing one or more cables 450. As is indicated in this figure, the seismic source 425 for the survey (e.g., which could utilize one or more airguns in marine surveys) will be located proximate to the central boat 415. Each time the source 425 is activated, the bulk of the seismic signal 520 travels downward through the sea floor and into deeper layers where subsequent reflections provide an image of the subsurface. However, a portion of the downgoing signal 510 will reflect upward from the sea floor and will be received by the towed receivers 450 (i.e., a multiple). In some instances, and as is generally indicated in this figure, the energy will continue to reverberate for some period of time between the sea floor and surface of the water, thereby creating a series of multiple reflections on the seismic record. Of course, those of ordinary skill in the art will recognize that this mechanism is only one of many ways in which multiples might be encountered in seismic data.

Such multiples can be conventionally attenuated and/or removed via any number of techniques (e.g., predictive deconvolution, velocity discrimination/stack, weighted stacks, Karhunen-Loeve transforms, etc.), however a preferred method of removing multiples—and this is especially popular in the case of 3-D surveys—is known by the acronym SRME (i.e., "surface related multiple elimination").

Broadly speaking, SRME operates on a seismic dataset that contains both primary reflections and multiple reflections by, first, estimating the multiply reflected energy and then subtracting the multiple estimate from the original data, thereby leaving (at least theoretically) only energy related to the primary reflections. In terms of equations, the object is to calculate the quantity $D_{SRME}$, where $D_{SRME}$ is the multiple-free (or multiple attenuated) data, according to the following formula:

$$D_{SRME} = D - âM,$$

where, D, is the original/multiple contaminated dataset, â is a time and space adaptive wavelet that preferably accommodates, among others things, the inverse source wavelet, and M is an array of predicted multiples. Those of ordinary skill in the art will recognize that this equation represents a leading order truncation of a larger series for removing multiples.

In SRME, the 2-D prediction may be written as the sum of the auto-convolutions of the data as is indicated below:

$$M(x_g | x_s; \omega) = \sum_x D(x_g | x; \omega) D(x | x_s; \omega),$$

where $M(x_g/s_x;\omega))$ is the 2-D multiple prediction, $x_g$ is the receiver location, $x_s$ is the source location, $D(x_g/x;\omega)$ is the shot at location x into a receiver at $x_g$, and $D(x/x_s; \omega)$ is the shot at $x_s$ into a receiver at location x, $\omega$ and is the angular temporal frequency.

The 3-D prediction is then the sum of many 2D prediction-like operations:

$$M(x_g, y_g \mid x_s, y_s; \omega) = \sum_y \left[ \sum_x D(x_g, y_g \mid x, y; \omega) D(x, y \mid x_s, y_s; \omega) \right]$$

$$= \sum_y F_y(x_g, y_g \mid x_s, y_s; \omega),$$

where, $$F_y(x_g, y_g \mid x_s, y_s; \omega) = \sum_x D(x_g, y_g \mid x, y; \omega) D(x, y \mid x_s, y_s; \omega),$$

and where the x and y variables correspond to locations in the in-line and cross-line directions, respectively.

Conventional methods of removing/attenuating multiples would proceed as is generally indicated in FIG. 6 (prior art). As a first step, seismic data (preferably 3-D data) is collected over a subsurface target of interest (step 605). Note that, although not specifically indicated in this figure, additional processing steps might be performed in conjunction with this step 605 (e.g., any or all of the steps in processing blocks 210, 215, and 230 could be performed depending on the preferences of the seismic processor).

As a next step 615, a 3-D DMO is calculated by applying a DMO algorithm to each offset gather. Note that, as is discussed in more detail below, any conventional DMO algorithm might be utilized (e.g., Kirchhoff, Liner's exact log DMO, Notfors DMO, etc.). Further, note that the use of the term "gather" herein is not meant to limit application of the methods disclosed herein to 2-D gathers but rather the term should be broadly construed to include 2-D gathers as well as 3-D collections of traces which might take the form of data volumes. Finally, those of ordinary skill in the art will recognize that when a DMO transformation is employed it is usually understood that NMO is applied to the traces beforehand. This means, of course, that some estimate of the velocity field (where "velocity field" is intended to include both simple/constant velocity functions as well as time and space varying velocity functions) must be available.

It should be noted that the loop that is represented in FIG. 6 by steps 620–640 will typically generate an enormous number of seismic traces as output, i.e., each of the original offset gathers will produce, as a specific example, an output that is about 60 times as large. For example, in the case where DMO is used to process a narrow azimuth marine survey, one object in the calculation of the DMO transformation is to create a wide azimuth data set from that narrow azimuth input. Thus, the original number of traces in the survey will typically be multiplied in size by a factor of about 60, thereby massively increasing the number of traces and the amount of computation that is required in the subsequent steps. Of course, those of ordinary skill in the art will recognize that all of these traces may not actually be generated and stored at one time, as there are well known methods for calculating them in groups as they are needed (e.g., traces can be calculated and used for each cross-line separately).

The prior art method of SRME loops over each cross-line offset (steps 620–640) and performs a calculation on each in turn. That is, within this loop an inverse DMO transformation is calculated (step 625) to generate the data at each selected crossline offset and return the simulated wide azimuth data to the time domain. Next, a 2-D SRME multiple prediction is calculated according to the equations presented previously and the data are typically sorted to improve the efficiency of the steps that follow (step 630).

Each cross-line 2-D SRME multiple prediction produced in step 630 is, of course, only a portion of the total 3-D solution and, as is indicated in FIG. 6, the total solution is created by accumulating the sums of the individual 2-D solutions (step 635). After the 2-D SRME predictions have been calculated and accumulated, the assemblage of traces that contain the predicted 3-D multiple signals is binned (if necessary) and subtracted from the input data volume (step 645) to produce a dataset as output in which the multiples have been attenuated and/or eliminated.

As is well known, the foregoing calculations may take several months to complete on a large 3-D dataset. However, the instant inventors have modified the previous methods in two principal methods that together have the potential to improve the computation speed by an order of magnitude.

The first modification to the prior art employed by the instant inventors is illustrated in FIG. 7 and is best understood by comparison with the corresponding prior art in FIG. 6. By way of general overview, the instant inventors have determined that it is possible to move the 2-D SRME prediction calculation (step 630 in the prior art) out of the cross-line offset loop 620–640, thereby greatly decreasing the computational effort that would otherwise be required.

In more particular, the instant inventive method 700 of attenuating/removing multiples begins with the collection of seismic data over a subsurface target of interest (step 705). As a next preferred step 710, a velocity function will be determined for the seismic data that is to be processed by the instant methods. As has been explained previously, in some cases this may be a rough/approximate (even constant) estimate of the subsurface velocity function whereas, in other cases, the velocity function will be a much more accurate 3-D velocity model that has been constructed from down hole surveys, well log data, VSPs, seismic velocity analyses, etc. The velocity function will be used in the NMO calculation that follows and, as will be recognized by those of ordinary skill in the art, potentially also used in other phases of the processing sequence.

Next, a 2-D SRME prediction is calculated for each 2-D line in the 3-D volume (step 720). For example, where the data are acquired via a towed marine survey, the 2-D SRME prediction calculation would preferably be performed on each of the "in-line" lines. That being said, other variations are certainly possible and are well within the ability of one of ordinary skill in the art to devise.

As a next preferred step 725, NMO will be applied to and a 3-D DMO will be calculated from the 2-D multiple predictions produced in step 720. In the preferred embodiment, the 2-D prediction data will be sorted into common offset volumes in preparation for such processing. Each such DMO transformation will, as described previously, increase the volume of data by a factor of, for example, 60 or so. However, note that in the preferred embodiment of the instant invention—unlike the prior art—this increase occurs after computation of the 2-D SRME predictions (step 720).

One important role that is served by the DMO transformation 725 is to regularize the input data. The regularization usually takes one of two forms. First, the data might be regularized to replace missing traces that have been previously been eliminated (e.g., "killed") either automatically or by the seismic processor. A second, and typically more important, sort of regularization is to create a regular grid of seismic data in which each gather/volume (whether sorted into CMPs, offsets, azimuths, shots, receivers, etc.) is at full fold and, preferably, densely sampled in both the in-line and cross-line directions. For purposes of the instant invention, the regularization is often used by the instant inventors to create a synthetic wide azimuth survey from a narrow azimuth towed marine seismic survey. Since SRME algorithms work best (or require) a regular grid of seismic data, the DMO transformation is especially useful in this regard.

Although, and as mentioned previously, many different algorithms could be used to calculate the DMO of step 725, but the preferred transformation of the inverse DMO is a 3-D version of Liner's 2-D method as set out in *Geophysics*, vol. 55, No. 5, pages 595–607, (May 1990), the disclosure of which is incorporated herein by reference as if fully set out at this point. To summarize the preferred 3-D implementation, the following DMO transformation expression for exact log DMO is preferably used:

$$P_o = \frac{e^{i(\Omega \Delta_s - k_y \cdot y_s)}}{(1-\beta^2)^{1/2}} P_n,$$

where, $h_x$ and $h_y$ are the offsets in x and y respectively, $k_x$ and $k_y$ are spatial wave numbers in x and y respectively, where $$\beta = \frac{y_s}{h_k},$$

$$h_k = h_x k_x + h_y k_y,$$

$$\Delta_s = \frac{1}{2}\ln(1-\beta^2),$$

and where, $$y_s = \frac{\Omega}{2}\left(1 - \sqrt{1 + \frac{4h_k}{\Omega^2}}\right).$$

Next, the instant method preferably enters a loop over cross-line offsets (steps 730–745). Within this loop, traces are computed for each such cross-line offset (step 730) using inverse DMO (step 735). Preferably, the inverse DMO step 735 will utilize a velocity function that is one-half of the primary-only velocity function (step 710) if it is desired to eliminate first-order multiples from the input data set. Similarly, and as is described hereinafter, if the goal is to eliminate second order multiples, a velocity function that is about equal to one-third of the primary-only velocity function would preferably be employed. This step 735 generates the prediction data at the selected crossline offset and returns it to the time domain where it is accumulated with other inverse DMOs (step 740), preferably by summing each together with the others as it is generated. That being said, summation is only one of many operations that would combine the multiple inverse DMOs produced by repeated iteration of steps 730 and 735 (e.g., a median stack could be used, as could a geometric average, weighted average, simple average, simple sum, or any other linear or non-linear method of combining multiple digital samples into a single representative value).

As a next preferred step, the instant program loops (step 745) back and selects the next cross-line offset (step 730) and preferably continues in this fashion until all of the designated offsets have been processed. At the conclusion of the iterative portion of the instant method, the accumulated sum (step 740) represents the 3-D SRME prediction of the multiple energy present within the seismic survey.

Finally, and as a next preferred step, the instant method continues by subtracting the predicted multiple signal(s) that have been previously calculated and accumulated from the input data (step 750), thereby eliminating or reducing the multiple energy in the original seismic data.

Note that as a preferred aspect of the instant embodiment, when the DMO (forward and inverse) is calculated the velocities that are used will preferably be one-half of the estimated subsurface velocity function. One rationale for doing this is explained as follows.

Figure 3:
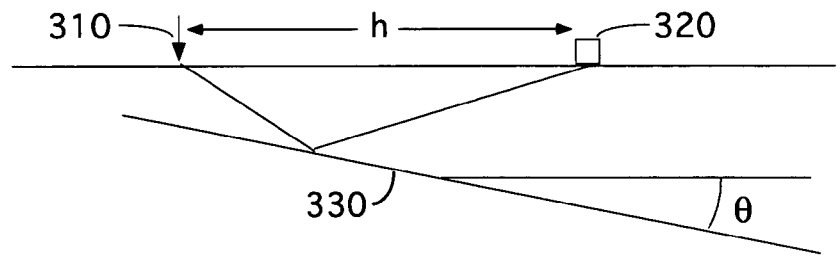
FIG. 3 contains an illustration of a simple travel-time model.

It is well known that the travel time equation for a single dipping layer, constant velocity, fixed midpoint seismic experiment can be written as follows (See FIG. 3):

$$t^2 = t_0^2 + \frac{h^2}{v^2}\cos^2\theta$$

$$= t_0^2 + \frac{h^2}{v^2} - \frac{h^2}{v^2}\sin^2\theta$$

$$= t_0^2 + \frac{h^2}{v^2} - \frac{h^2}{4}\left(\frac{dt_0}{dx}\right)^2$$

$$= t_0^2 + \frac{h^2}{v^2} - \frac{h^2}{4}\left(\frac{dk_x}{dw_0}\right)^2$$

where, t is the two way travel time from shot 310 to receiver 320, $t_0$ is the zero offset travel time, h is the shot-receiver distance (offset), $\theta$ is the angle of dip of subsurface reflector 330, $k_x$ is the midpoint wave number, and $\omega_0$ is the zero offset frequency.

Note that this equation can be written for a fixed source location as:

$$t^2 = t_0^2 + \frac{h^2}{v^2} + \frac{t_0 2h}{v}\sin\theta.$$

Computing a multiple prediction for a zero offset trace can be done by performing the autoconvolution of the seismic traces in this gather and summing over offset, or in the context of the above equation, doubling the arrival times of the primary reflections. The autoconvolution traces before summation are termed a pre-summation gather and can be written as $$(2t)^2 = (2t_0)^2 + \frac{h^2}{(v/2)^2} + \frac{2t_0 2h}{(v/2)}\sin\theta$$

$$t_m^2 = t_{m0}^2 + \frac{h^2}{(v/2)^2} + \frac{t_{m0} 2h}{(v/2)}\sin\theta,$$

where $t_m$ represents the arrival time of the presumption multiple prediction, and to represents the presumption multiple prediction zero-offset time. Since the DMO operations are performed in the fixed midpoint offset space, transforming the pre-summation multiple prediction gather to this space allows a comparison with the DMO operation applied to primaries. This gives $$t_m^2 = t_{m0}^2 + \frac{h^2}{(v/2)^2} - \frac{h^2}{(v/2)^2}\sin^2\theta$$

which suggests that, when applying a DMO inverse algorithm to sections containing predicted multiples from the SRME process, the velocity function that should be used to image the multiples will preferably be one-half of that used to image the primary reflections in the same data. For example, when applying moveout (e.g., to remove the NMO correction) v/2 will preferably be used for a first order multiple. For a second order multiple, the velocity v/3 will preferably be used, and so on. In the constant velocity case, this obviously means that the velocity used for inverting the DMO will be numerically equal to one-half of the constant forward velocity. In the case of a non-constant velocity function, the velocities that are used in the forward DMO could be the primary velocities shifted by the two-way water bottom time. Or, for example and alternatively, a conventional velocity analysis could be employed to obtain a time/velocity function. Then, preferably, the velocities of the picked multiple events would be used in the forward DMO direction and one-half of each of those picked velocities would be used in the inverse direction to attenuate first order multiples.

Those of ordinary skill in the art will recognize that, strictly speaking, it is not necessary to adjust the velocity function by a factor of 2 (or 3, etc.) but instead an equivalent result may be obtained by, for example, doubling (or tripling, etc.) all of the trace offsets or other distances in the survey.

Furthermore, in situations where the crossline offset is small (e.g., less than about 1500 m), the DMO part of these equations can be neglected and the offset regularization can be performed using NMO only. This small-offset implementation significantly reduces the 3D multiple prediction computation time.

Turning next to another preferred aspect of the instant invention, there is provided a method of calculating a DMO transformation that is much more efficient than methods used previously. In brief, the instant method is broadly based on the observation that, instead of using a single time window in the log-stretch domain to calculate a DMO, multiple preferably overlapping windows are used, each such window having an artificially assigned start time near (but not equal to) zero.

It should be noted as an initial matter that the DMO calculation taught herein would be suitable for use with any algorithm that utilizes a log-time stretch. Of course, a preferred implementation of the F-K DMO transformation employs such a stretch and, as such, will be used hereinafter as a specific example of a DMO variant that would be suitable for use with the embodiment. That being said, any log stretch DMO algorithm that can be calculated in the F-K domain would be a candidate for the windowing strategy discussed hereinafter.

The instant method of calculating a DMO transformation is suitable for use with any forward or inverse DMO algorithm including, by way of example only, a Kirchhoff DMO algorithm, Liner's exact log DMO, Notfors DMO, etc. That being said, in the preferred arrangement a Kirchhoff-based DMO will be used to compute the forward DMO (i.e., step 725, which regularizes the data and/or creates a wide azimuth data set) and an F-K inverse DMO algorithm (step 735), which algorithm is preferred when the data grid is regular. However, those of ordinary skill in the art will recognize that it is possible to use a log stretch F-K DMO algorithm in either the forward (or inverse) direction when the data are irregularly spaced by using discrete Fourier transforms. As a consequence, the instant invention should not be limited in its scope to operating exclusively in either the forward or inverse direction.

Figure 8:
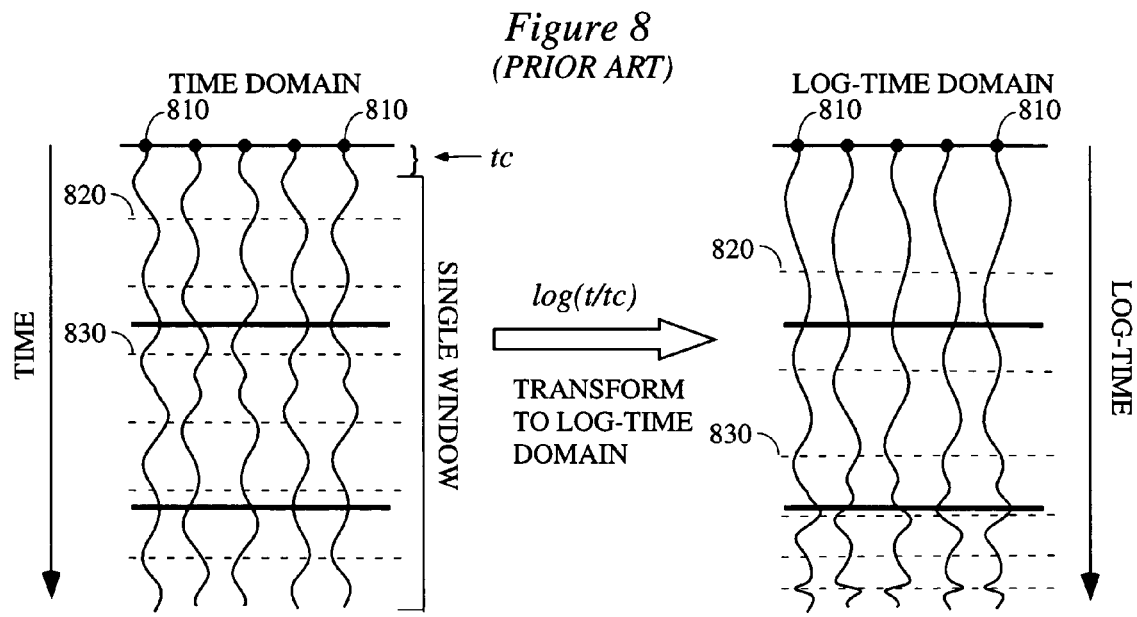
FIG. 8 contains a schematic illustration of how seismic traces are converted from the time domain to the log-time domain as a step in the preferred embodiment of the instant invention.

Turning first to FIG. 8 (prior art), as is well known to those of ordinary skill in the art, transforming seismic traces 810 into the log-stretch domain, e.g., mapping a series in time t to a series in tau, where tau=ln(t/tc), simplifies the computations of a number of multi-dimensional processes, where tc is the time of the first sample that is to be processed. Note that the quantity t/tc is dimensionless. FIG. 8 illustrates in a general way how the log transformation takes equally spaced time observations and translates them into unequally spaced observations in the log-stretch domain (e.g., consider the timing lines 820 and 830 that are equally spaced in the time domain but unequally spaced in the log-time domain).

Unfortunately, choosing a value of tc involves certain computational and quality tradeoffs, tradeoffs that become increasingly problematic as the data set size becomes larger. For example, if a small value of tc is selected, the resulting computation will be of high quality and will tend to preserve more of the data at the beginning of the computational window. However, decreasing the value of tc will cause the number of samples in the log-stretch domain to grow exponentially, thereby increasing the processing time and the memory required to compute the DMO.

On the other hand, if the parameter tc is taken to be a relatively large value, the computational load is decreased correspondingly, but many samples will be lost at the beginning of the trace and, for very large choices of tc, the quality of the DMO calculation will suffer.

Of course, in either case, i.e., whether a large or small value of tc is chosen, many samples are created in the log-stretched version of the series relative to the number of samples in the original series. As a consequence, the log-stretched series will tend to be highly over-sampled as compared with the original data.

Figure 10:
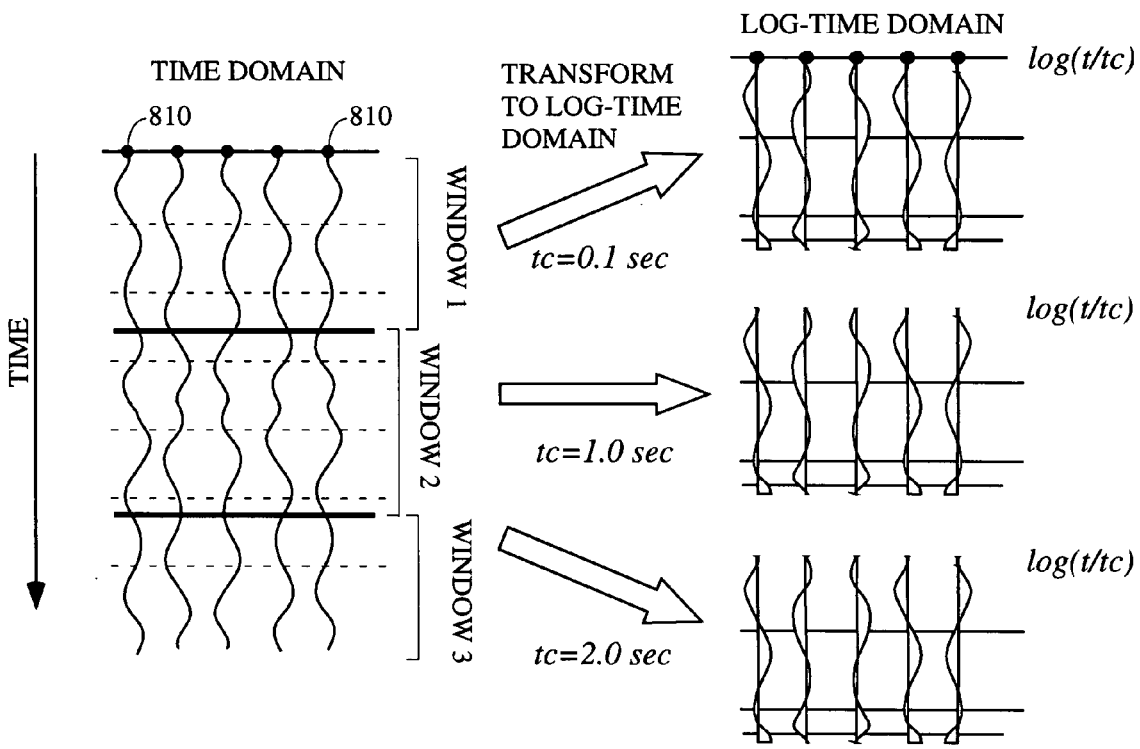
FIG. 10 illustrates the preferred windowing scheme for use with the DMO embodiment of the instant invention.

Thus, and according to a preferred embodiment and as is best illustrated by reference to FIG. 10, there is provided herein a new method of calculating a DMO transformation that utilizes several smaller preferably overlapping windows instead of the single window that has been used heretofore. Each such window will have its own tc (i.e., time of first sample processed) and, preferably, each will be chosen to have approximately the same length in the log-time domain (although this is for computational convenience only and is not a requirement). Using this approach the instant inventors have determined that the computational effort involved in calculating a DMO in multiple smaller windows will be less than that required to calculate the same DMO in a single longer window, even if the windows utilized are overlapped significantly. The reduction in the relative over-sampling of the log-stretched series greatly reduces the overall number of computations and, even though there may be some window overlap, the net effect is to reduce the total number of computations required. Although the windowed log stretch trace will generally have more samples than the original trace, it will not be exponentially more.

By way of specific example, consider a case where DMO is to be applied to a collection of seismic traces that are 10 seconds in length according to the methods taught in the prior art. Heretofore a single computational window 10-seconds in length has been used during the DMO calculations (FIG. 8, prior art). If, for example, tc (the first time to be processed) is chosen to be 0.1 seconds, the values of tau, the log-stretched sample interval, will vary between 0, for t=tc, to 4.605 for t=10. If the sample interval of the original time series is 0.004 seconds, the corresponding sample interval in the log-stretched domain will be dtau=dt/tmax, where tmax is the maximum time, 10 seconds, and dt is the input sample interval, 0.004, giving a sample interval in the log-stretched domain Δτ of 0.0004. Transformation with these parameters yields 25000 samples (tmax/Δτ) in the log-stretched domain, compared to the 2250 samples in the original time domain seismic trace. This is more than 10 times the number of samples that were found the original series. Most of the excess samples are generated near the beginning of the log-stretched series to accommodate the sample interval required to accurately represent the data at the end of the series.

Figure 9:
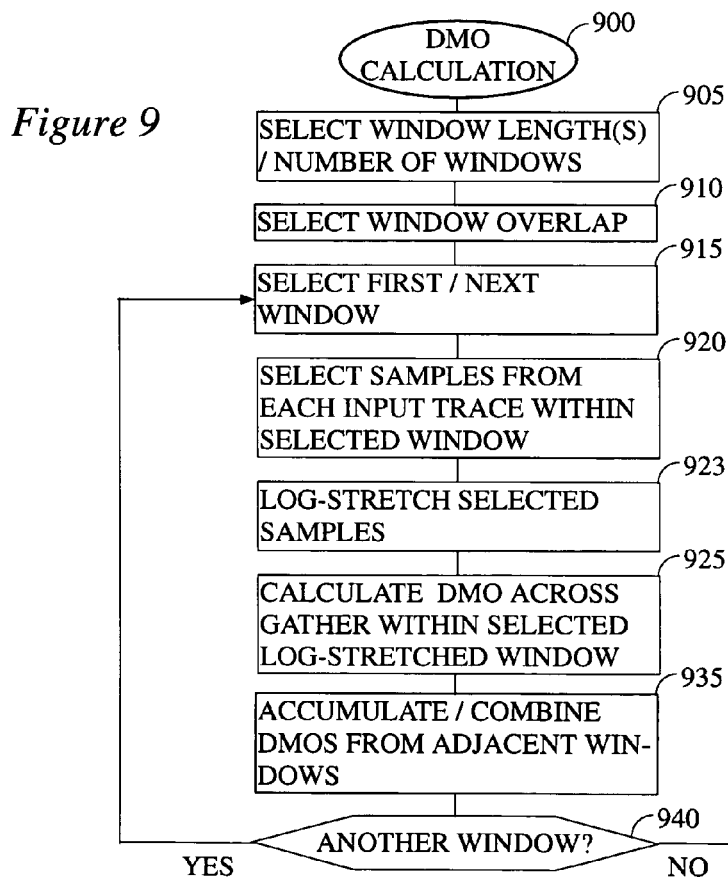
FIG. 9 contains a flowchart that illustrates some preferred steps in the preferred DMO calculation embodiment of the instant invention.

Turning now to the details of the instant invention as generally set out in FIG. 9, in the preferred embodiment multiple windows will be used in the DMO calculation, each such window preferably overlapping the other and each having its own start time. Additionally, in one preferred arrangement an optimal window size will be determined according to a preferred calculation algorithm discussed hereinafter.

As is generally indicated in FIG. 9, the instant DMO calculation method 900 preferably begins with the selection of a window length or, alternatively, the selection of the number of windows that are to be used in the calculation (step 905). Note that in the preferred embodiment, each window will be chosen to be of the same length in the log transform domain (i.e., each window will necessarily have a different time-domain length) but that is not strictly required. In other preferred arrangements, a single window length might be specified for the entire trace, the window lengths might be chosen to become systematically longer (or shorter) depending on where they occur in time and/or the expected dip of the seismic events therein, etc. Any approach that utilizes time varying windows will tend to be less efficient because, among other reasons, changing the window size usually necessitates setting up a new fast Fourier transform (i.e., FFT), reconfiguring various memory buffers, etc. However, for purposes of simplicity in the discussion that follows, it will be assumed that each window is of equal time-domain length, i.e., each will encompass the same number of time domain samples.

Another consideration in selecting the window size is that the use of many short duration windows results in a more efficient DMO calculation but, depending on the length of each window, short windows can tend to act as a dip filter, thereby potentially attenuating some dipping events in the seismic data. On the other hand, using only a few large windows results in an algorithm that requires more time to compute, but results in a less efficient calculation.

A next preferred step 910 is to select the amount of window overlap. Note that an overlap between adjacent windows need not be used, but in the preferred arrangement, a 10-sample overlap will be used. If an overlap is used, the data within the overlap region might be combined by, for example, calculating a weighted combination of the data values from the upper and lower windows. Of course, the amount of overlap need not be a constant but could be varied from window-to-window Returning now to FIG. 9, as a next preferred step the first (or next) window will be selected (step 915). A starting sample number and an ending sample number will preferably be determined for the currently selected window and those samples on each trace that fall within those limits are thereby selected for processing in the subsequent steps. Of course, it is also possible that the starting and/or ending sample number might be different for each trace (depending, for example, on whether or not the data have been previously moved out), but that would not be the preferred embodiment.

Next, preferably samples will be selected from each of the traces in the current gather (step 920) according to the starting/ending limits of the currently selected window. Note that, as is often done, the input seismic traces will preferably have previously been moved out and sorted into offset gathers to make calculation of the DMO more efficient. That being said, sorting into offsets is an optional step and whether or not that particular operation is performed will vary depending, for example, on the DMO variant that is calculated, the domain in which it is performed, etc.

Next, the instant invention will preferably apply a log stretch to the selected samples (step 923) and then calculate a DMO transformation using the data in the currently selected window (step 925). Note that the DMO transformation calculated in this step could be either the forward (e.g., step 725) or inverse (e.g., step 735) algorithm. As has been discussed previously, preferably a Kirchhoff-based DMO will be used to compute the forward DMO and an F-K algorithm will be used to calculate its inverse.

If the current window is the first window, the instant invention preferably continues by reading/processing a second window (steps 930 and 915). If, on the other hand, this current window is a second or subsequent window, in one preferred embodiment the DMO calculations from the two windows are combined to yield the output DMO. If there is no overlap between the two windows, then the DMO from each can be directly added to the output DMO buffer for the current gather. On the other hand, if there is some degree of overlap between the two windows, the non-overlapping portions will preferably be combined according to the scheme described below (step 935). Thereafter, the instant invention preferably continues to process each of the defined windows in the current gather until all have been processed.

Figure 11:
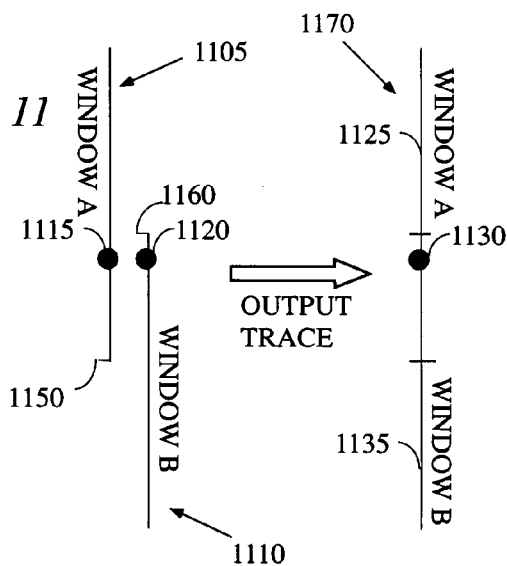
FIG. 11 contains a schematic illustration of how overlapping windows in the preferred DMO embodiment of the instant invention are preferably handled.

As a simple schematic illustration of one preferred way of combining DMO calculations from adjacent windows, consider, the example scenario contained in FIG. 11. In this figure, the samples from Window A 1105 are to be combined with the samples from adjacent/lower Window B 1110 to yield output trace 1170. Within the overlap region, data point 1115 in Window A 1105 will preferably be combined with data point 1120 in Window B 1110 to yield data point 1130 in the output trace. If a weighted sum of data values 1115 and 1120 is used, one preferred weighting scheme would be to weight data value 1115 directly proportional to its distance from the lower terminus 1150 of Window A 1105 and to weight data value 1120 directly proportional to its distance from the upper terminus 1160 of Window B 1110. Additionally, preferably the non-overlapping portions of Window A and Window B will have their values directly carried over to the output trace (e.g., the upper section 1125 of output trace 1170 will consist of values from Window A and the lower section 1135 will contain the values from Window B.

The advantage of using the instant inventive method to calculate a forward/inverse DMO may readily be demonstrated as follows. Returning to the example introduced previously, consider a 10 second seismic trace wherein ten non-overlapping windows of length 1 second are utilized (cf. generally FIGS. 8 and 10). In the preferred embodiment, the time domain windows will be selected of differing lengths so as to yield equal length transformed windows in the log-stretch domain. For example, if the first window starts at 0.1 seconds (i.e., tc=0.1 sec) and ends at 1.0 seconds, and if the trace sample rate is 0.004, the number of samples in the log-stretch domain would be 576. This means that the next window will need to start at 1.0 sec. and end at about 2.5 sec. to yield a window of 576 samples. Repeating this calculation until the entire 10 second trace is stretched yields a total number of samples in the log stretch domain of about 2880 samples assuming that there is no window overlap (i.e., six windows) as compared with about 11,500 using a single window analysis. Thus, in this illustrative example the instant method when used with time domain varying window lengths yields comparable results with about one-fourth few data points.

As another example and as is illustrated in Table 1 below, if constant time-domain windows are used in connection with the previous scenario (e.g., ten 1-second windows), tc will preferably be equal to the starting time within each window (with the exception that the first window which must not start at zero time). See generally FIG. 10 wherein for purposes of simplicity no window overlap is utilized. In the first window, if tc is taken to be 0.1 seconds, the values of tau, the log-stretched sample interval, will vary between 0, for t=tc, to 2.303 for t=1.0 in the first window. If the sample interval of the original time series is 0.004 seconds, the corresponding sample interval in the log-stretched domain will be dtau=dt/tmax, where tmax is 1 second, and dt is 0.004, giving a sample interval in the log-stretched domain of 0.004. Transformation with these parameters yields about 576 samples produced by transforming the first window. Repeating this calculation for each of the 1-second windows in the full length of the 10-second trace (with tc equal in each case to the starting time of the window) yields a total of about 3132 samples in the log-time domain. Compared with the 11,500 samples required by prior art DMO caculation algorithms, it should be clear that the instant method could potentially reduce the amount of computation that is required by a substantial amount. Even if some amount of overlap is introduced into the calculation (e.g., each window might be 1.1 seconds in length with a 0.1 second overlap), the total number of computations will still be substantially less than would be required by the prior art methods. Finally, and as has been discussed previously, using fewer windows has the potential to reduce the computational load even further.

TABLE 1

Windowed DMO Sample Size Calculation
(sample rate = 0.004, equal length time-domain windows)

| tc | tmax | No. Time-Domain Samps. | ln(tmax/tc) | dtau = dt/tmax | Samples |
|---|---|---|---|---|---|
| 0.1 | 1 | 225 | 2.3026 | 0.0017 | 576 |
| 1 | 2 | 250 | 0.6931 | 0.0058 | 347 |
| 2 | 3 | 250 | 0.4055 | 0.0099 | 304 |
| 3 | 4 | 250 | 0.2877 | 0.0139 | 288 |
| 4 | 5 | 250 | 0.2231 | 0.0179 | 279 |
| 5 | 6 | 250 | 0.1823 | 0.0219 | 273 |
| 6 | 7 | 250 | 0.1542 | 0.0259 | 270 |
| 7 | 8 | 250 | 0.1335 | 0.0300 | 267 |
| 8 | 9 | 250 | 0.1178 | 0.0340 | 265 |
| 9 | 10 | 250 | 0.1054 | 0.0380 | 263 |
| | | | | | 3132 |

Finally, in another preferred aspect of the instant invention a calculation is made to determine the window length that is best, given the current trace length, sample interval, number of windows, etc. Those of ordinary skill in the art will recognize that a table may readily be constructed that contains the total number of log-time domain samples that result from a given window size (or number of windows) choice, together with an estimate of the cost of the calculation per/sample and possibly weighted by other factors that impact run time (e.g., the amount of memory/disk required, etc.). By determining the total number of samples that would be produced for a range of window sizes, a good (or perhaps near-optimal) window length may be selected. Those of ordinary skill in the art will readily be able to devise such a table.

CONCLUSIONS

The instant invention utilizes two advancements in order to achieve significant decreases in computer run-time when multiple removal via SRME is utilized. First, the instant inventors have determined that by reversing the order of the calculation of the 2-D SRME predictions and the forward and inverse DMO calculations can result in significant computational speed improvements.

Second, the instant inventors have discovered a more efficient way to calculate a forward or inverse DMO transformation that utilizes multiple, preferably overlapping, windows in the log-stretch domain, rather than the single-window approach used heretofore. This step reduces the computations that are necessary and also reduces the memory requirements that are necessary to obtain an accurate DMO calculation. The reduction in memory is important in its own right because processes that use log-stretch transforms tend to be multi-channel algorithms that already push the limits of current computer memories. As seismic acquisition continues to expand the number of channels recorded, reducing computer processing time and memory use will become more critical. Even with the expected increases in computer speed and memory sizes, the methods taught herein make previously impractical processes economical by reducing run times for large 3-D datasets from years to months.

It should be noted that the method of log-stretch windowing used to improve the efficiency of DMO calculations would also be useful in other contexts. For example, certain Radon transforms are known to be most efficiently calculated in the log-stretch time domain. As such, those sorts of transformations would also be candidates for the sort of windowing taught herein.

Although the invention disclosed herein was discussed almost exclusively in terms of seismic traces organized into "CMP" or offset gathers, that was done for purposes of specificity only and not out of any intent to limit the instant invention to operation on only that sort of gather. So, within the text of this disclosure, the term CMP gather is used in the broadest possible sense of that term, and is meant to apply to conventional 2-D and 3-D CMP gathers, as well as to other sorts of gathers which might include, without limitation, CRP gathers, CCP gathers (i.e., "common conversion point" gathers), CACP ("common asymptotic conversion point") gathers, etc, the most important aspect of a "gather" being that it represents an organized collection of unstacked seismic traces from either a 2-D or 3-D survey all of which have at least one subsurface image point in common.

Finally, in the previous discussion, the language has been expressed in terms of operations performed on conventional seismic data. But, it is understood by those skilled in the art that the invention herein described could be applied advantageously in other subject matter areas, and used to locate other subsurface minerals besides hydrocarbons, e.g., coal. By way of additional examples, the same approach described herein could be used to process and/or analyze multi-component seismic data, shear wave data, or model-based digital simulations of any of the foregoing.

While the inventive device has been described and illustrated herein by reference to certain preferred embodiments in relation to the drawings attached hereto, various changes and further modifications, apart from those shown or suggested herein, may be made therein by those skilled in the art, without departing from the spirit of the inventive concept, the scope of which is to be determined by the following claims.

What is claimed is:

1. A method of attenuating multiply reflected energy in a seismic data set, comprising the steps of:
    (a) selecting at least a portion of said seismic data set, wherein said selected portion of said seismic data set has at least two 2-D seismic lines contained therein;
    (b) obtaining a first subsurface velocity function over at least said selected portion of said seismic data set;
    (c) obtaining a second subsurface velocity function over at least said selected portion of said seismic data set;
    (d) calculating a SRME prediction for each of said plurality of 2-D seismic lines, thereby producing a plurality of 2-D predicted seismic lines;
    (e) using at least said first subsurface velocity function to calculate a 3-D DMO of each of said 2-D predicted seismic lines, thereby producing a plurality of DMO'ed predictions;
    (f) only after performing at least steps (d) and (e),
        (f1) selecting a crossline offset,
        (f2) using said second subsurface velocity function to calculate an inverse DMO of said DMO'ed predictions assuming said selected crossline offset; and,
        (f3) performing steps (f1) and (f2) at least twice for at least two different crossline offsets and combining together any of said inverse DMOs so calculated in step (f2), thereby forming a 3-D multiple prediction;
    (g) using said 3-D multiple prediction to attenuate multiply reflected energy in the seismic data set, thereby creating a multiple-attenuated seismic data set; and,
    (h) storing at least a portion of said multiple-attenuated seismic data set in a computer readable medium for subsequent use in seismic exploration within a predetermined portion of the subsurface of the earth.

2. A method of attenuating multiply reflected energy in a seismic data set according to claim 1, wherein step (g) comprises the step of:
    (g1) subtracting said 3-D multiple prediction from said selected portion of said seismic data set, thereby attenuating multiply reflected energy in the seismic data set.

3. A method of attenuating multiply reflected energy in a seismic data set according to claim 1, wherein step (e) comprises the steps of:
    (e1) determining a starting time and an ending time for said 2-D predicted seismic lines,
    (e2) selecting a plurality of time windows that span said starting and ending time,
    (e3) within each of said plurality of time windows, performing a separate log time-stretch, thereby producing a log-stretched window,
    (e4) using at least said first subsurface velocity function to calculate a separate log-stretch 3-D DMO for each of said log-stretched windows,
    (e5) combining said 3-D DMOs from step (e4) to produce a plurality of DMO'ed predictions, each of said DMO'ed predictions being comprised of a plurality of seismic traces and having a plurality of crossline offsets associated therewith.

4. A method of attenuating multiply reflected energy in a seismic data set according to claim 3, wherein one or more of said plurality of time windows overlap in time.

5. A method of attenuating multiply reflected energy in a seismic data set according to claim 1, wherein said first subsurface velocity function is a constant velocity.

6. A method of attenuating multiply reflected energy in a seismic data set according to claim 1, wherein said first and said second subsurface velocity functions are a same subsurface velocity function.

7. A method of attenuating multiply reflected energy in a seismic data set according to claim 1, wherein the multiply reflected energy in the seismic data set comprises first order multiply reflected energy, and wherein said second subsurface velocity function is numerically equal to about one-half of said first velocity function.

8. A method of attenuating multiply reflected energy in a seismic data set according to claim 1, wherein step (f3) comprises the step of:
    (f3) performing steps (f1) and (f2) at least twice for at least two different crossline offsets and summing together any of said inverse DMOs so calculated in step (f2), thereby forming a 3-D multiple prediction.

9. A method of attenuating multiply reflected energy in a seismic data set according to claim 1, comprising the further steps of:
    (i) reading at least a portion of said stored multiple-attenuated seismic data set from said computer readable medium; and,
    (j) displaying in a visually perceptible form at least a portion of said multiple-attenuated seismic data set read from said computer readable medium.

10. A method of attenuating multiply reflected energy in a seismic data set according to claim 1, wherein step (h) comprises the step of:
    (h1) storing at least a portion of said multiple-attenuated seismic data set in a computer readable medium for subsequent use in seismic exploration within a predetermined portion of the subsurface of the earth, wherein said computer readable medium is selected from a group consisting of computer RAM, computer ROM, a PROM chip, flash RAM, a ROM card, a RAM card, a floppy disk, a magnetic disk, a magnetic tape, a magneto-optical disk, an optical disk, a CD-ROM disk, or a DVD disk.

11. A computer readable medium containing a plurality of computer instructions implementing the method of claim 1, wherein
    said computer instructions are for programming a digital computer to perform said method, and,
    said computer readable medium is selected from a group consisting of computer RAM, computer ROM, a PROM chip, flash RAM, a ROM card, a RAM card, a floppy disk, a magnetic disk, a magnetic tape, a magneto-optical disk, an optical disk, a CD-ROM disk, or a DVD disk.

12. A method of geophysical exploration within a predetermined volume of the earth containing subsurface structural and stratigraphic features conducive to the generation, migration, accumulation, or presence of hydrocarbons, comprising the steps of:
    (a) conducting a seismic survey over at least a portion of said predetermined volume of the earth, said seismic survey being comprised of a plurality of seismic traces that image at least a portion of the predetermined volume of the earth;
    (b) selecting at least a portion of said plurality of seismic traces, thereby forming a seismic data set, wherein said selected seismic traces comprise at least two 2-D seismic lines;

(c) obtaining a first subsurface velocity function applicable to said seismic data set;
(d) obtaining a second subsurface velocity function applicable to said seismic data set;
(e) calculating a SRME prediction for each of said plurality of 2-D seismic lines, thereby producing a plurality of 2-D predicted seismic lines;
(f) using at least said first subsurface velocity function to calculate a 3-D DMO of each of said 2-D predicted seismic lines, thereby producing a plurality of DMO'ed predictions;
(g) only after performing at least steps (e) and (f),
  (g1) selecting a crossline offset,
  (g2) using said second subsurface velocity function to calculate an inverse DMO of said DMO'ed predictions assuming said selected crossline offset, and,
  (g3) performing steps (g1) and (g2) at least twice for at least two different crossline offsets and combining together any of said inverse DMOs so calculated in step (g2), thereby forming a 3-D multiple prediction;
(h) using at least said 3-D multiple prediction to attenuate multiply reflected energy in the seismic data set, thereby creating a multiple-attenuated seismic data set; and,
(i) using said multiple-attenuated seismic data set to identify said features conducive to the generation, migration, accumulation, or presence of hydrocarbons within said predetermined volume of the earth.

13. A method of attenuating multiply reflected energy in a seismic data set according to claim 12, wherein said first subsurface velocity function is a constant velocity.

14. A method of attenuating multiply reflected energy in a seismic data set according to claim 12, wherein said first and said second subsurface velocity functions are a same subsurface velocity function.

15. A method of attenuating multiply reflected energy in a seismic data set according to claim 12, wherein the multiply reflected energy in the seismic data set comprises first order multiply reflected energy, and wherein said second subsurface velocity function is numerically equal to about one-half of said first velocity function.

16. A method of attenuating multiply reflected energy in a seismic data set according to claim 12, wherein step (i) comprises the steps of:
  (i1) displaying in a visually perceptible form at least a portion of said multiple-attenuated seismic data set, and,
  (i2) using said displayed portion of said multiple-attenuated seismic data set to identify said features conducive to the generation, migration, accumulation, or presence of hydrocarbons within said predetermined volume of the earth.

* * * * *